United States Patent [19]

Dohi et al.

[11] 4,429,773
[45] Feb. 7, 1984

[54] ELECTROMAGNETIC CLUTCH AND BRAKE

[75] Inventors: Takashi Dohi; Nozomu Shinozaki, both of Hirakata; Shigeo Neki, Osaka, all of Japan

[73] Assignee: Matsushita Electric Industrial Co., Ltd., Osaka, Japan

[21] Appl. No.: 287,074

[22] Filed: Jul. 21, 1981

[30] Foreign Application Priority Data

| Jul. 31, 1980 [JP] | Japan | 55-106125 |
| Nov. 17, 1980 [JP] | Japan | 55-162424 |
| Nov. 17, 1980 [JP] | Japan | 55-162425 |
| Nov. 17, 1980 [JP] | Japan | 55-162426 |
| Jan. 30, 1981 [JP] | Japan | 56-13438 |

[51] Int. Cl.³ .................................................. B60K 41/24
[52] U.S. Cl. ................................ 192/18 B; 192/84 C
[58] Field of Search ................ 192/18 B, 18 A, 18 R, 192/30 V, 70.17, 70.18, 70.19, 84 C

[56] References Cited

U.S. PATENT DOCUMENTS

| 2,524,311 | 10/1950 | Fieux | 192/70.18 |
| 2,659,830 | 11/1953 | Mason et al. | 192/18 B |
| 3,504,773 | 4/1970 | Miller | 192/18 B |
| 3,624,767 | 11/1971 | Kroeger | 192/18 B |
| 3,674,122 | 7/1972 | Buisker | 192/18 B |
| 3,750,781 | 8/1973 | Lengsfeld | 192/18 B |
| 3,777,864 | 12/1973 | Marti | 192/18 B |
| 4,172,985 | 10/1979 | Meier | 192/18 B |
| 4,256,211 | 3/1981 | Katkov | 192/18 A |

*Primary Examiner*—George H. Krizmanich
*Attorney, Agent, or Firm*—Spencer & Frank

[57] ABSTRACT

An electromagnetic clutch for use with a motor having a fixed bracket and a rotatable motor shaft which comprises a flywheel attached to the motor shaft and an output shaft rotatably supported by the bracket. A clutch rotor is attached to the output shaft so as to extend between the flywheel and a radial portion of the bracket. A clutch section is provided which includes a clutch ring axially movable with respect to the flywheel when a clutch solenoid is energized. A brake section is also provided which includes a brake ring axially movable with respect to the bracket when a brake solenoid is energized. Both the clutch and brake rings are mounted on sliding members which may be axially displaced relative to pins secured to the flywheel and bracket, respectively. Buffer members are interposed between the rings and sliding members.

8 Claims, 7 Drawing Figures

ELECTROMAGNETIC CLUTCH AND BRAKE

BACKGROUND OF THE INVENTION

The present invention relates to an electromagnetic clutch motor having an electromagnetic power transmission mechanism, adapted for use as the driving source of an industrial sewing machine.

In this type of electromagnetic clutch, a cluch disc and a brake disc slide along a spline formed on an output shaft to transmit the driving torque and braking torque. Electromagnetic clutches of the kind described are being used in increasing numbers as the driving power source of industrial sewing machines. In such uses, a large pulsation of the torque is caused to generate a loud noise due to the presence of play between the spline and the discs. The magnetic circuit has three gaps. Two out of these three gaps are radial gaps so that they do not produce any attracting force. These two gaps, however, are inevitably large because they are the gaps between a rotary part and a stationary part. In consequence, the magnetic circuit does not efficiently generate an attracting force in response to the electric input (ampere-turns) to the clutch coil and the brake coil.

SUMMARY OF THE INVENTION

Accordingly, an object of the invention is to provide an electromagnetic clutch motor comprising a flywheel fixed to a motor shaft, a clutch ring secured to the flywheel so that it is non-rotatable but axially movable, a bracket supporting an output shaft, a brake ring non-rotatably secured to the bracket but axially movable, a clutch rotor fixed to the output shaft, an electromagnetic means adapted to selectively press the clutch ring or brake ring to the clutch rotor by electromagnetic force, thereby to permit the transmission of a large torque with a small number of ampere-turns and with a reduced level of noise.

Another object of the invention is to provide an electromagnetic clutch motor of the type stated above, wherein the clutch ring and the brake ring are pressed by a clutch spring and a brake spring thereby to diminish the time lag in acceleration and deceleration of the clutch rotor, i.e. the output shaft, while avoiding the generation of noise due to collision between the clutch and brake rings and the clutch rotor, and, by selecting the spring force of the brake spring to be greater than the spring force of the clutch spring, avoiding the unnecessary idling of the output shaft.

These and other objects, as well as advantageous features of the invention will become more clear from the following description of the preferred embodiments taken in conjunction with the accompanying drawings.

DESCRIPTION OF THE PREFERRED EMBODIMENTS

Before turning to the detailed description of the preferred embodiments of the invention, an explanation will be made as to a typical conventional electromagnetic clutch motor to make the drawbacks of the prior art and, hence, the advantages of the invention, fully understood.

Figure 1:
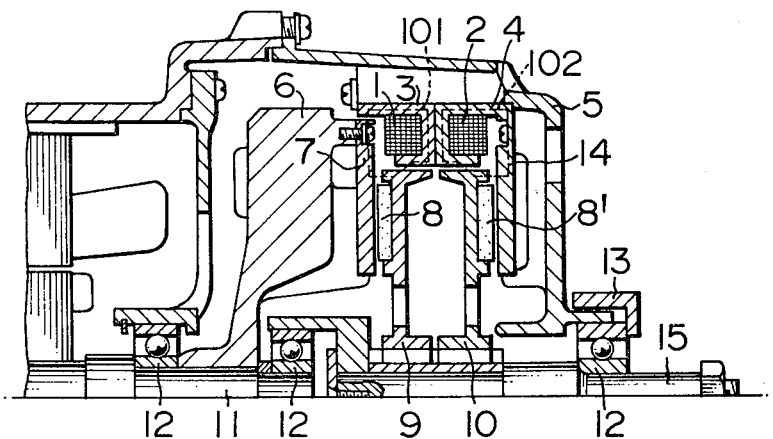
FIG. 1 is a sectional view of an essential part of a conventional electromagnetic clutch motor.

Referring to FIG. 1 showing a typical conventional electromagnetic clutch motor, a clutch coil 1 and a brake coil 2 are embedded in a clutch stator core 3 and a brake stator core 4, respectively. The clutch stator core 3 and the brake stator core 4 are fixed to a bracket 5. A clutch ring 7 is fixed to a flywheel 6 adapted to be continuously driven by a motor. A clutch disc 9 having a lining 8 and a brake disc 10 having a lining 8' are splined to an output shaft 15 coaxial with the motor shaft 11, in such a manner as not to be able to rotate relatively to the output shaft 15 but able to move axially on the latter. The arrangement is such that, as the clutch coil 1 is energized, a magnetic flux 101 is produced to generate a magnetic attracting force between the clutch ring 7 and the clutch disc 9 to displace the latter 9 to the left to bring the lining 8 into frictional engagement with the clutch ring 7, thereby to permit the transmission of the torque to the output shaft 15.

The electric current supplied to the clutch coil 1 can be controlled by a speed controller (not shown) to control the speed of rotation of the output shaft 15. As the brake coil 2 is energized, it produces a magnetic flux 102 which acts to press the brake disc 10 and its lining 8' to a brake ring 14 fixed to the bracket 5, so that the output shaft 15 is rapidly decelerated and stopped. A reference numeral 12 designates a ball bearing, while a reference numeral 13 denotes a gap adjusting screw.

In the conventional electromagnetic clutch motor having the described construction, the clutch disc 9 and the brake disc 10 are slid along the spline on the output shaft 15 to transmit the torque and braking power. This type of electromagnetic clutch motor has found increasing use, as stated before, as the driving power source of industrial sewing machines. In such a use, there is a large pulsation of torque resulting in the generation of noise due to the play or looseness of the spline. The magnetic circuit includes three gaps two of which are radial gaps which do not contribute at all to the production of the magnetic attracting force. These gaps are, however, inevitably large because they are the gaps between the rotary and stationary parts. In consequence, the magnetic circuit does not efficiently generate an attracting force in response to the electric current (ampere-turns) supplied to the clutch coil 1 and the brake coil 2.

A preferred embodiment of the invention will be described hereinunder with reference to FIGS. 2 and 3.

Figure 2:
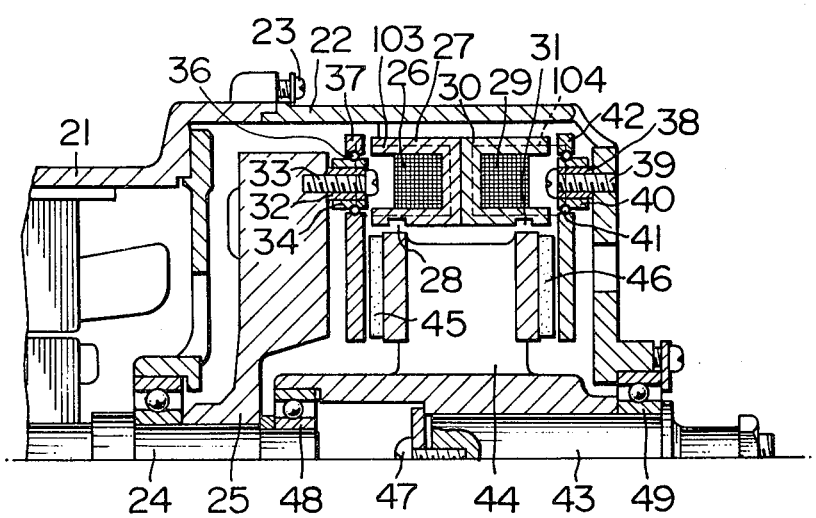
FIG. 2 is a sectional view of an essential part of an electromagnetic clutch motor constructed in accordance with an embodiment of the invention.
Figure 3:
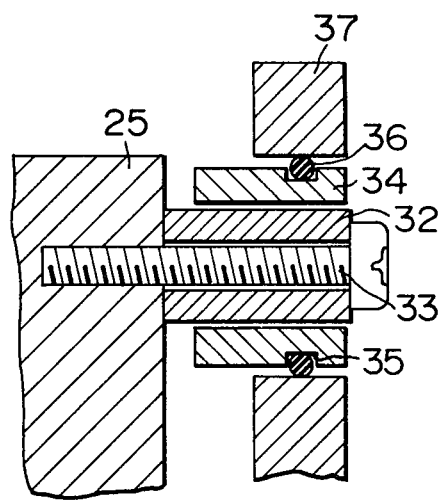
FIG. 3 is an enlarged sectional view of the electromagnetic clutch motor of the invention showing particularly the structure for securing a clutch ring.

Referring to FIG. 2, an electromagnetic clutch motor of the invention has a motor bracket 21 and a clutch bracket 22 which are secured to each other by three screws 23, only one of which is shown. A flywheel 25 is fixed to a motor shaft 24 which in turn is fixed to a motor rotor so that the flywheel 25 rotates as a unit with the motor rotor.

A clutch coil 26 and a brake coil 29 are embedded, respectively, in a clutch stator core 27 and a brake stator core 30 which in turn are fixed to the clutch bracket 22. The clutch coil 26 and clutch stator core 27 comprise a clutch solenoid, and the brake coil 29 and brake stator core 30 comprise a brake solenoid. The clutch stator core 27 and the brake stator core 30 are provided with portions 28 and 31 of reduced cross-sectional area.

A plurality of cylindrical clutch pins 32 are mounted in the circumferential direction on the flywheel 25, and are fixed by means of screws 33. A metal clutch bearing 34 as a sliding member is carried by the pins 32 with gaps of an order of several tens of microns so as to be able to slide in the axial direction relatively to the pins 32. A peripheral groove 35 for receiving a clutch "O" ring 36 as a buffer material or sealing element is formed in the outer periphery of the metal bearing 34. The "O" ring 36 is lightly pressed into a recess in a clutch ring 37 so that the clutch ring 37 is movable as a unit with the metal bearing 34 in the axial direction of the pins 32. The same construction applies to the brake side. Namely, a plurality of brake pins 38 are fixed to the bracket 22 by means of screws 39. A brake ring 42 is mounted so as to be axially movable on the pins 38 through the medium of a metal clutch bearing 40 and a clutch "O" ring 41.

Linings 45 and 46 are bonded to both sides of a clutch rotor 44 made of a light metal such as aluminum or a synthetic resin, so as to oppose the clutch ring 37 and the brake ring 42. The clutch rotor 44 is fixed by means of screws 47 to the output shaft 43. These members are supported by the motor shaft 24 and the bracket 22 through bearings 48 and 49.

This type of electromagnetic clutch motor finds its major use as the driving power source of industrial sewing machines and, therefore, is required to have a good response to the demand for acceleration and deceleration of the output shaft 43 to attain high sewing efficiency. In addition, in the industrial sewing machine, it is a common requisite that means be provided to stop the sewing needle at a predetermined position. In order to achieve precise stopping, it is necessary to minimize the angle of slippage between the actual stopping position of the output shaft and the position at the moment of receipt of the stopping instruction. To this end, it is necessary to diminish the inertia of the output shaft 43 as much as possible. This is the reason why the clutch rotor 44 fixed to the output shaft 43 is made of a light metal such as aluminum or a synthetic resin. As to the material of the clutch rotor, test results showed that so-called FRP (fiber reinforced plastics), particularly, unsaturated polyester resin reinforced with glass fiber is suitable for use as the material of the clutch rotor 44. This material has great mechanical strength, high dimensional precision and high heat resistance which in turn promises small distortion due to heat. It has a specific weight which is as low as 1.7 so that the inertia is decreased correspondingly to reduce the inertia of the output shaft to a level of about 30% of that in the conventional apparatus shown in FIG. 1, thereby ensuring good acceleration and deceleration characteristic of the electromagnetic clutch motor. In addition, the clutch rotor made of synthetic resin serves to suppress squeal noises. Uncomfortable high frequency noise which might be produced by the engagement of clutches or brakes are effectively suppressed by selecting suitable synthetic resins or by adding a small amount of rubber powders.

Figure 4:
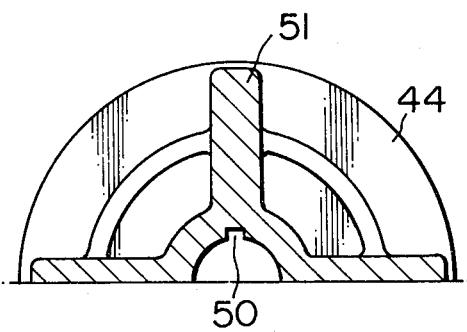
FIG. 4 is a sectional view of an essential part of the electromagnetic clutch motor of the invention having a clutch rotor formed of a synthetic resin.

Preferably, the clutch rotor 44 has a construction as shown in FIG. 4. Namely, the clutch rotor 44 preferably has a keyway 50 for preventing the clutch rotor 44 from slipping relative to the output shaft 43, as well as a plurality of radial ribs 51 bridging both sides thereof where the friction members are attached. Namely, these ribs ensure sufficiently high mechanical strength while the amount of material used is diminished to reduce both cost and inertia. It is also to be noted that, since this clutch rotor 44 has a form resembling an impeller, it can serve also as a fan to distribute cooling air to every portions of the electromagnetic clutch motor.

In general, aluminum or synthetic resin is not suitable as the material of a sliding member. Therefore, the linings 45,46 are fastened to both sides of the clutch rotor 44. However, alternatively, the linings 45,46 may be attached to the clutch ring 37 and the brake ring 42 while the surfaces of the aluminum clutch rotor 44 for making frictional engagement with these linings 45,46 are treated by an alumite treatment or chromium plating to improve their wear resistance.

The electromagnetic clutch motor of the first embodiment having the heretofore described construction operates in the manner explained hereinbelow. As the clutch coil 26 is energized, a magnetic flux 103 is produced which moves the clutch ring 37 to the right because the clutch stator core 27 is fixed to the clutch bracket 22. In consequence, the clutch ring 37 is brought into frictional engagement with the clutch rotor 44 through the lining 45, so that the torque of the motor is transmitted to the output shaft 43. According to the design of the clutch motor, a gap of an order of 0.5 to 1.0 mm is preserved in this state between the clutch ring 37 and the end surface of the clutch stator core 27. Then, as the brake coil 29 is energized, a magnetic flux 104 is produced to attract the brake ring 42 to the left, so that the clutch rotor 44 is brought into frictional engagement with the brake ring 42 through the lining 46. In consequence, the output shaft 43 is quickly decelerated and stopped because the brake ring 42 is secured non-rotatably to the clutch bracket 22. The design is such that a gap of an order of 0.5 to 1.0 mm is preserved also between the brake ring 42 and the brake stator core 30.

The linings 45 and 46 are made mainly of compressed cork, so that they are worn out gradually as a result of repeated frictional engagement with the clutch ring 37 and the brake ring 42. In consequence, the gap between the end surface of the clutch stator core 27 and the clutch ring 37, as well as the gap between the end surface of the brake stator core 30 and the brake ring 42, is reduced to cause an increase of the magnetic attracting force. As will be seen from curve A in FIG. 5, the change in the magnetic attracting force is parabolically related to the change in the gap. In contrast to the conventional apparatus shown in FIG. 1, the arrangement heretofore described permits the formation of an efficient magnetic circuit because both of two gaps contribute to the production of the magnetic force. On the other hand, however, the attracting force is rapidly increased as the result of wear in the linings 45 and 46 thereby promoting the wear of linings 45,46 or shortening the life of the ball bearings 48,49.

Figure 5:
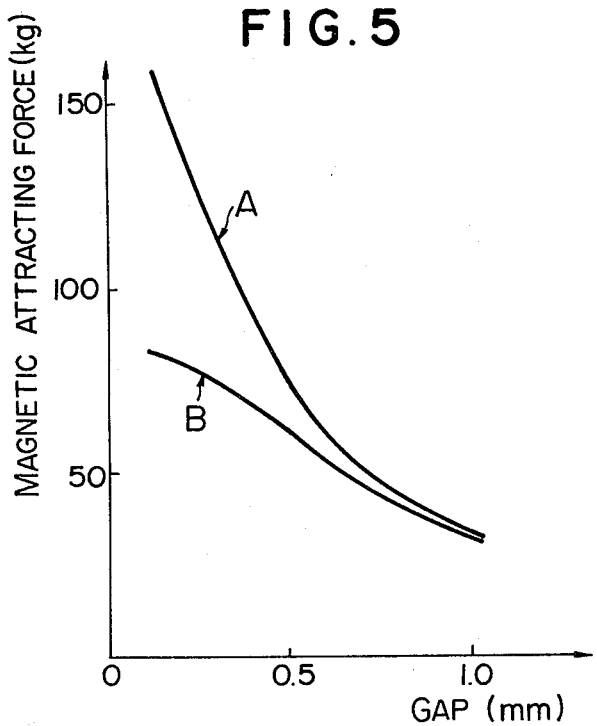
FIG. 5 is a chart showing the characteristic of the electromagnetic clutch.

To overcome this problem, according to the invention, the clutch stator core 27 and the brake stator core 30 are partially notched to have portions 28,31 of reduced cross-sectional areas, thereby to reduce the rate of change of the magnetic attracting force in relation to the change of the gap as shown by curve B of FIG. 5. Namely, in the initial state in which the gap falls between 0.5 and 1.0 mm, the influence, i.e. the reduction of attracting force, by these notches is not so appreciable, but the increase of the attracting force is considerably suppressed when the gap has become smaller as the result of the wear of the linings 45 and 46.

This is attributable to the fact that, when the gap has become smaller, the clutch stator core 27 and the brake stator core 30 are magnetically saturated due to the presence of the portions 28,31 of smaller cross-sectional area and suppress further an increase of the magnetic fluxes 103 and 104. It is, therefore, possible to obviate the problems of promotion of wear of the linings 45,46 and the shortening of the life of the ball bearings 48,49 due to excessive magnetic attracting force which in turn is caused by the wear of the linings 45,46. The portions of the reduced cross-sectional areas may be formed at portions other than the illustrated positions, these positions having suitably selected to facilitate fabrication. The cross-sectional areas of these portions can easily be determined in accordance with the B-H characteristic of the iron material used.

As stated before, the electromagnetic clutch motor of the kind described finds its major use as the driving power source of industrial sewing machines in which a large pulsation of torque inevitably occurs. This pulsation of torque in turn tends to generate noize due to vibration afforded when there is a large gap between the pins 32 and the metal bearing 34 or between the pins 38 and the metal bearing 40. If the above-mentioned gap is decreased to reduce the level of the noise, the clutch ring 37 and the brake ring 42 are thermally expanded due to the heat generated in the lining to further reduce the gap. This impedes the axial movement of the rings and results in failure of the safe torque transmitting function.

As a result of tests, it has been confirmed that, when the metal bearings 34,40 are directly attached to the clutch ring 37 and the brake ring 42 without the medium of the "O" rings 36,41, the level of noise is increased to an unacceptably high amount. This occurs when the gap between the metal bearing 34 and the pins 32 or the gap between the metal bearing 40 and the pins 38 exceeds 30 μm. Therefore, in order to reduce the level of the noise, the aforementioned gap was selected experimentally to be 20 to 25 μm. In this case, however, the clutch ring 37 and the brake ring 42 are thermally expanded due to the heat generated by the friction at the linings 45,46 thereby increasing the diameter of the pitch circle to which the metal bearings 34,40 are attached. This nullifies the aforementioned gap to cause contact between the metal bearing 34 and the pins 32, as well as between the metal bearing 40 and the pins 38, to prohibit the axial movement of the clutch ring 37 and the brake ring 42. In such a state, it is not possible to perform the torque transmission and braking functions.

In contrast, when the "O" rings 36,41 are fitted around the metal bearings 34,40, no substantial noise was generated even when the aforementioned gap is increased to 100 μm, thanks to the provision of the "O" rings which effectively absorb the vibration. An experiment was conducted by reducing the aforementioned gap to 10 μm, with the presence of the "O" rings 36,41, to permit the linings 45,46 to generate heat by which the clutch ring 37 and the brake ring 42 are thermally expanded. In this case, elimination of any galling between the metal bearing 34 and the pins 32, and between the metal bearing 40 and the pins 38 enables the rings to smoothly slide in the axial direction to achieve their functions. This is because the change of size due to thermal expansion of the clutch ring 37 and the brake ring 42 is effectively absorbed by the "O" rings 36,41.

Figure 6:
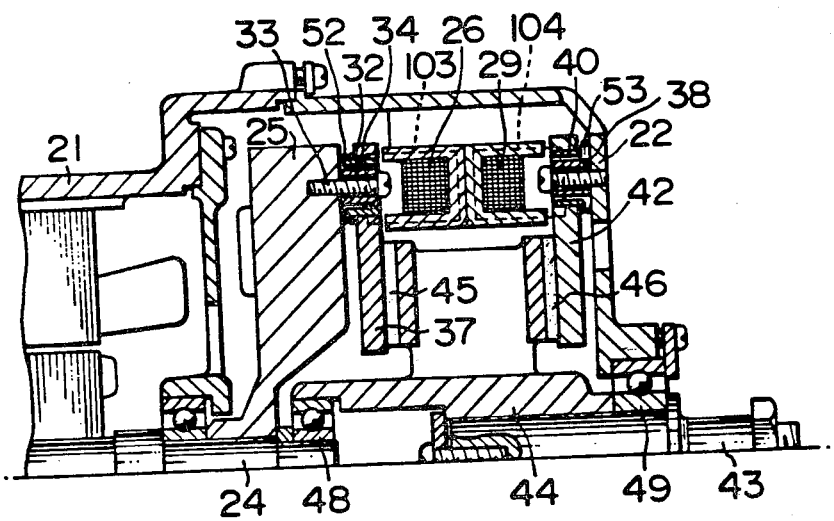
FIG. 6 is a sectional view of an essential part of an electromagnetic clutch motor constructed in accordance with another embodiment of the invention; and, FIG. 7 is an enlarged sectional view of the electromagnetic clutch motor shown in FIG. 6, showing particularly the structure for securing the clutch ring.
Figure 7:
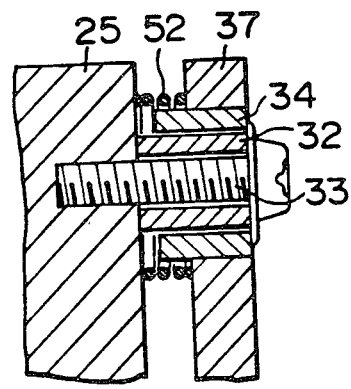

Referring now to FIGS. 6 and 7 showing a second embodiment of the invention, the clutch ring 37 is axially movably attached through the metal bearing 34 to pins 32 which in turn are fixed to the flywheel 25. In this embodiment, the clutch ring 37 is lightly pressed against the lining 45 by means of a clutch spring 52. On the other hand, the brake ring 42 is axiallly movably attached through the metal bearing 40 to the pins 38 fixed to the bracket 22, and is lightly pressed against the lining 46 by means of the brake spring 53.

Since the clutch ring 37 and the brake ring 42 are beforehand lightly pressed against the associated linings of the clutch rotor 44 by the force of the clutch spring 52 and the brake spring 53, it is possible to reduce the time length of the transient period from the moment at which the clutch coil 26 or the brake coil 29 is energized till the torque or the braking force is actually applied to accelerate or decelerate the output shaft. This remarkably improves the efficiency of the sewing work when the electromagnetic clutch motor of this embodiment is used as the driving power source of the industrial sewing machine. In addition, since the clutch ring 37 and the brake ring 42 are lightly pressed beforehand against the linings 45,46, the undesirable impacting noise which is inevitably generated in the conventional clutch motor is perfectly eliminated to ensure a "quiet" operation of the clutch motor.

It is true that the output shaft 43 tends to rotates even when the clutch coil 26 is not energized, because the clutch ring 37 is lightly pressed against the lining 45 by the clutch spring 52. In order to avoid this problem, in this embodiment of the invention, the pressing force exerted by the brake spring 53 is selected to be greater than that exerted by the clutch spring 52 to obtain a sufficient braking force to prevent the output shaft 34 from rotating when rotation is not desired.

What is claimed is:

1. An electromagnetic clutch for use with a motor having a fixed bracket and a rotatable motor shaft, comprising
a flywheel attached to said motor shaft for rotation therewith;
an output shaft rotatably supported by said bracket, the axis of rotation of said output shaft being substantially coaxial with the axis of rotation of said motor shaft;
a clutch rotor attached to said output shaft, said clutch rotor being located between said flywheel and a radial portion of said bracket;
a clutch section including
  a plurality of clutch pins attached to a face of said flywheel opposing said clutch rotor;
  a plurality of clutch sliding members, each of said clutch sliding members surrounding one of said plurality of clutch pins and being axially displaceable with respect thereto;
  a clutch ring having a plurality of apertures therein, each of said apertures surrounding one of said plurality of clutch sliding members;

a plurality of clutch buffer members interposed between each of said plurality of clutch sliding members and said clutch ring, said clutch ring being prevented from rotating relative to said flywheel but being displaceable in the axial direction with respect thereto, said buffer members permitting radial expansion of said clutch ring with respect to said flywheel; and a clutch solenoid secured to said bracket adjacent said clutch ring, energization of said clutch solenoid bringing said clutch ring into contact with said clutch rotor, whereby said output shaft is rotated as a unit with said motor shaft; and a brake section including
a plurality of brake pins attached to a face of said bracket opposing said clutch rotor;
a plurality of brake sliding members, each of said brake sliding members surrounding one of said plurality of brake pins and being axially displaceable with respect thereto;
a brake ring having a plurality of apertures therein, each of said apertures surrounding one of said plurality of brake sliding members;
a plurality of brake buffer members interposed between each of said plurality of brake sliding members and said brake ring, said brake ring being prevented from rotating relative to said bracket but being displaceable in the axial direction with respect thereto, said buffer means permitting radial expansion of said brake ring with respect to said bracket; and
a brake solenoid secured to said bracket adjacent said brake ring, energization of said brake solenoid bringing said brake ring into contact with said clutch rotor, whereby the rotation of said output shaft is stopped.

2. An electromagnetic clutch as claimed in claim 1, wherein said sliding members comprise metal bearings and said buffer members are sealing elements fitted into the outer periphery of said metal bearings, said clutch and brake rings being connected to their associated metal bearings by said sealing elements.

3. An electromagnetic clutch as claimed in claim 1 wherein said clutch section further comprises at least one clutch spring acting on said clutch ring to press said clutch ring into contact with said clutch rotor, and wherein said brake section further comprises at least one brake spring acting on said brake ring to press said brake ring into contact with said clutch rotor, said brake spring having a greater spring force than said clutch spring.

4. An electromagnetic clutch as claimed in claim 1 wherein said clutch and brake solenoids each have a stator core, and wherein as least one of said stator cores is notched to form a portion thereof having a reduced cross-sectional area, said clutch ring and the stator core of said clutch solenoid forming a first magnetic circuit and said brake ring and the stator core of said brake solenoid forming a second magnetic circuit.

5. An electromagnetic clutch as claimed in claim 1, wherein said clutch rotor is made of a light metal, and the surfaces of said clutch rotor to be frictionally engaged by said clutch ring and said brake ring have been subjected to a surface treatment.

6. An electromagnetic clutch as claimed in claim 1, wherein said clutch rotor is shaped from a synthetic resin.

7. An electromagnetic clutch as claimed in claim 6, wherein said clutch rotor is shaped from a fiber-reinforced plastic.

8. An electromagnetic clutch as claimed in claim 6 or 7, wherein said clutch rotor is provided with a plurality of radial ribs.

* * * * *